(12) United States Patent
Lykins et al.

(10) Patent No.: US 8,979,073 B2
(45) Date of Patent: Mar. 17, 2015

(54) INSULATED CONTAINER WITH FAN

(71) Applicants: Kelli-Jean Lykins, Montgomery, TX (US); Steven Lawrence Lykins, Montgomery, TX (US)

(72) Inventors: Kelli-Jean Lykins, Montgomery, TX (US); Steven Lawrence Lykins, Montgomery, TX (US)

( * ) Notice: Subject to any disclaimer, the term of this patent is extended or adjusted under 35 U.S.C. 154(b) by 250 days.

(21) Appl. No.: 13/732,569

(22) Filed: Jan. 2, 2013

(65) Prior Publication Data
US 2013/0168882 A1    Jul. 4, 2013

Related U.S. Application Data

(60) Provisional application No. 61/582,589, filed on Jan. 3, 2012.

(51) Int. Cl.
| | |
|---|---|
| *B01F 3/04* | (2006.01) |
| *B65D 90/00* | (2006.01) |
| *F04D 29/70* | (2006.01) |
| *F24F 6/14* | (2006.01) |
| *A45C 5/14* | (2006.01) |
| *A45C 11/20* | (2006.01) |
| *A45C 13/28* | (2006.01) |
| *A45C 15/00* | (2006.01) |
| *F04D 25/08* | (2006.01) |
| *B62B 1/12* | (2006.01) |
| *B62B 5/06* | (2006.01) |
| *F24F 5/00* | (2006.01) |
| *B65D 81/38* | (2006.01) |

(52) U.S. Cl.
CPC .............. *B65D 90/00* (2013.01); *F04D 29/705* (2013.01); *F24F 6/14* (2013.01); *A45C 5/14* (2013.01); *A45C 11/20* (2013.01); *A45C 13/28* (2013.01); *A45C 15/00* (2013.01); *F04D 25/084* (2013.01); *B62B 1/125* (2013.01); *B62B 5/065* (2013.01); *F24F 5/0035* (2013.01); *B65D 81/38* (2013.01); *B62B 2204/00* (2013.01); *B62B 2204/04* (2013.01); *B62B 2204/06* (2013.01); *F24F 2221/38* (2013.01); *Y02B 30/545* (2013.01); *Y10S 261/43* (2013.01)
USPC ...... 261/30; 261/78.2; 261/116; 261/DIG. 43; 62/314

(58) Field of Classification Search
CPC ..... B01F 3/04; B01F 3/04014; B01F 3/04021; B01F 3/04049; F28B 5/00
USPC ............... 261/30, 78.2, 116, DIG. 43; 62/314, 62/331; 220/592.2
See application file for complete search history.

(56) References Cited

U.S. PATENT DOCUMENTS

| | | | |
|---|---|---|---|
| 8,631,665 B1 * | 1/2014 | Declementi | 62/314 |
| 2010/0043474 A1 * | 2/2010 | Strussion | 62/259.4 |

* cited by examiner

*Primary Examiner* — Robert A Hopkins
(74) *Attorney, Agent, or Firm* — King & Spalding LLP

(57) ABSTRACT

An insulated container including a body and a handle coupled to the body. The handle includes a cooling module that includes a fan. The handle is movable between a retracted position and an extended position causing the fan to move from a first position to a second position. The handle optionally includes one or more misting nozzles that are oriented to direct a fluid into the profile of the fan.

20 Claims, 7 Drawing Sheets

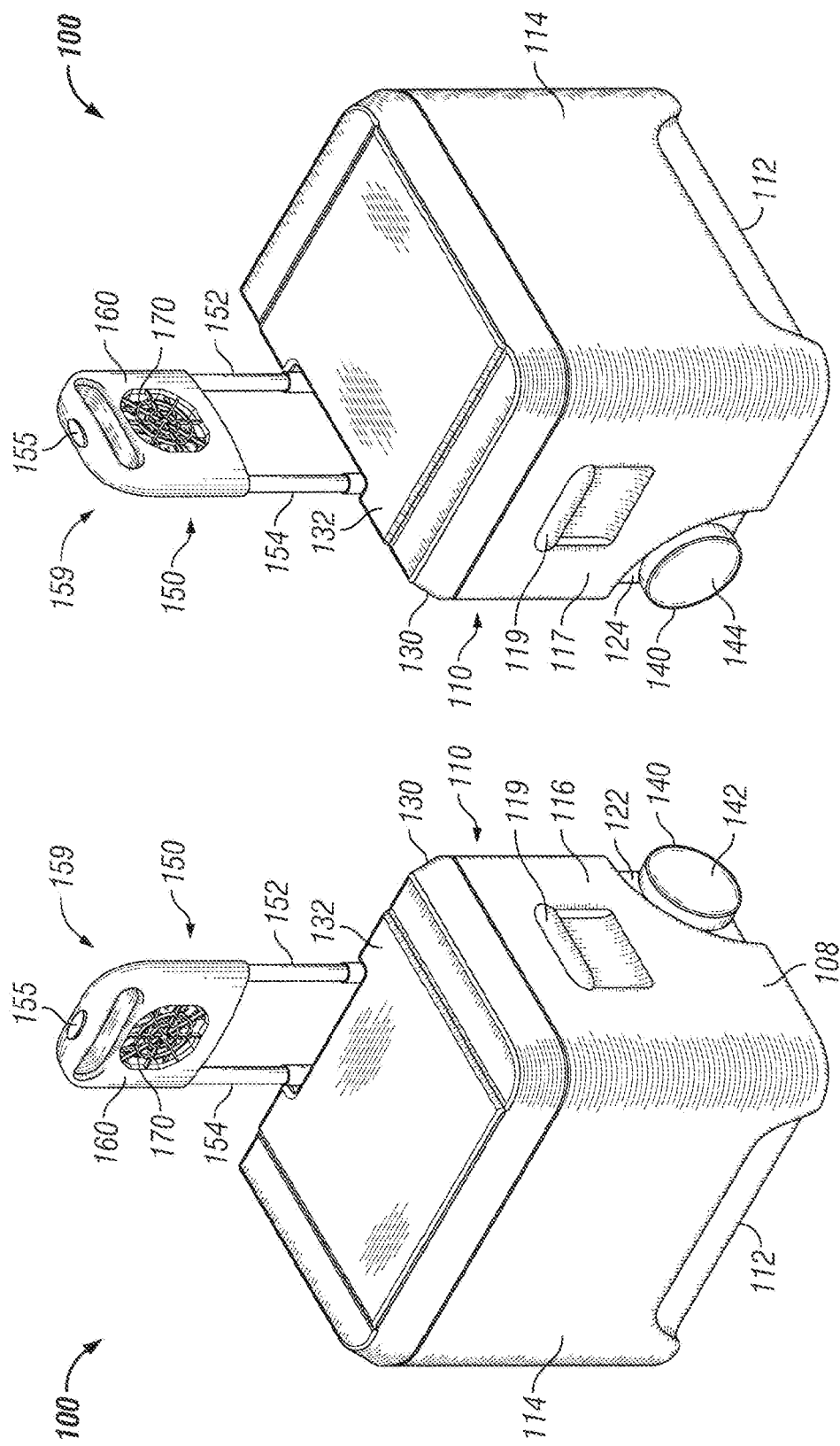

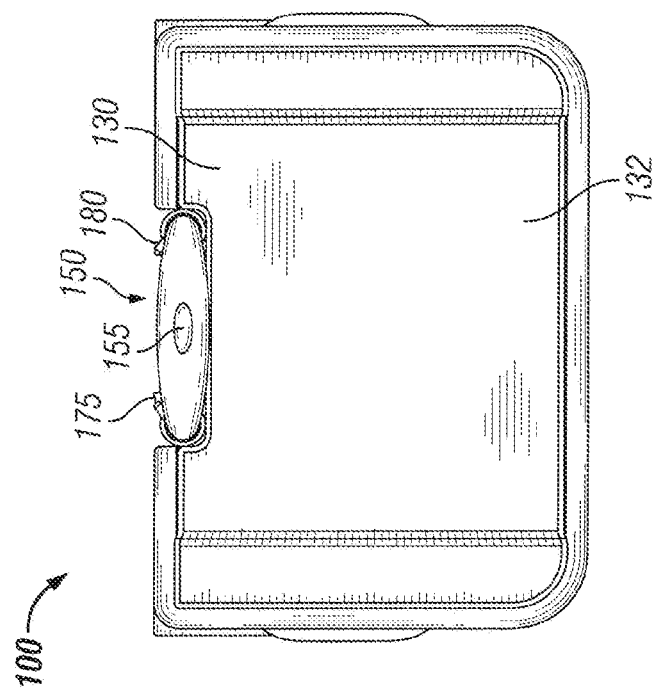
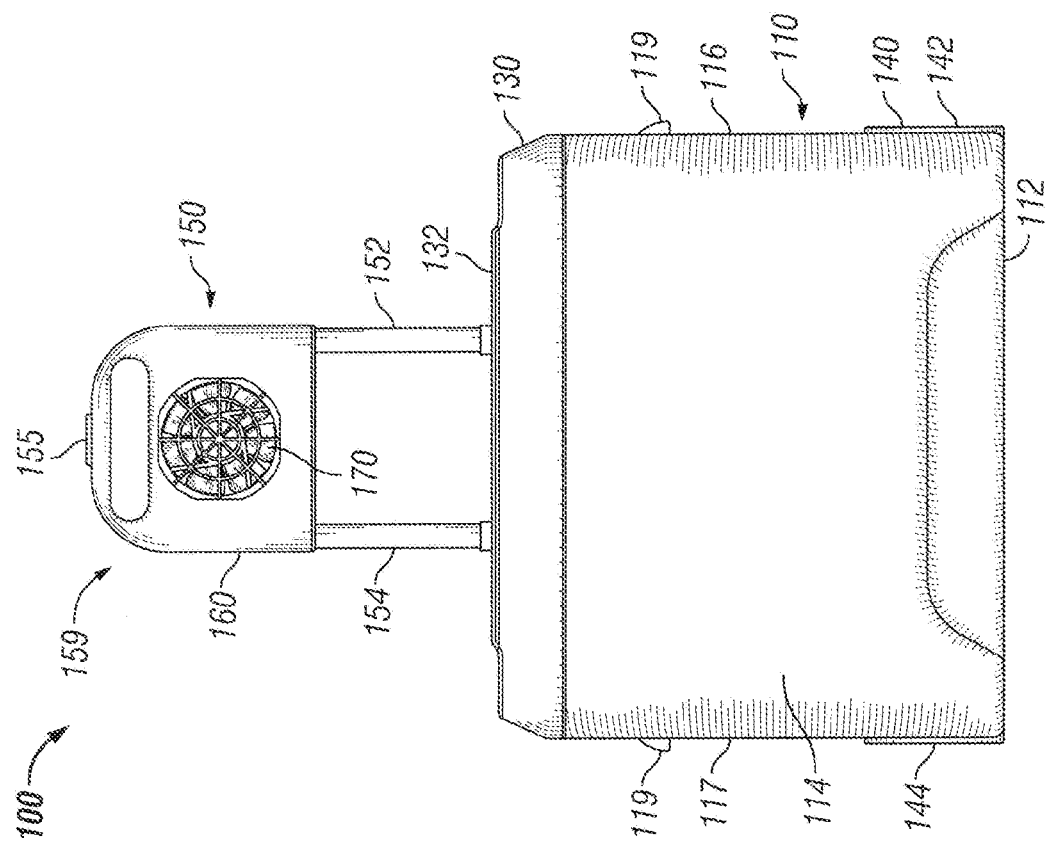
FIG. 1E
FIG. 1F

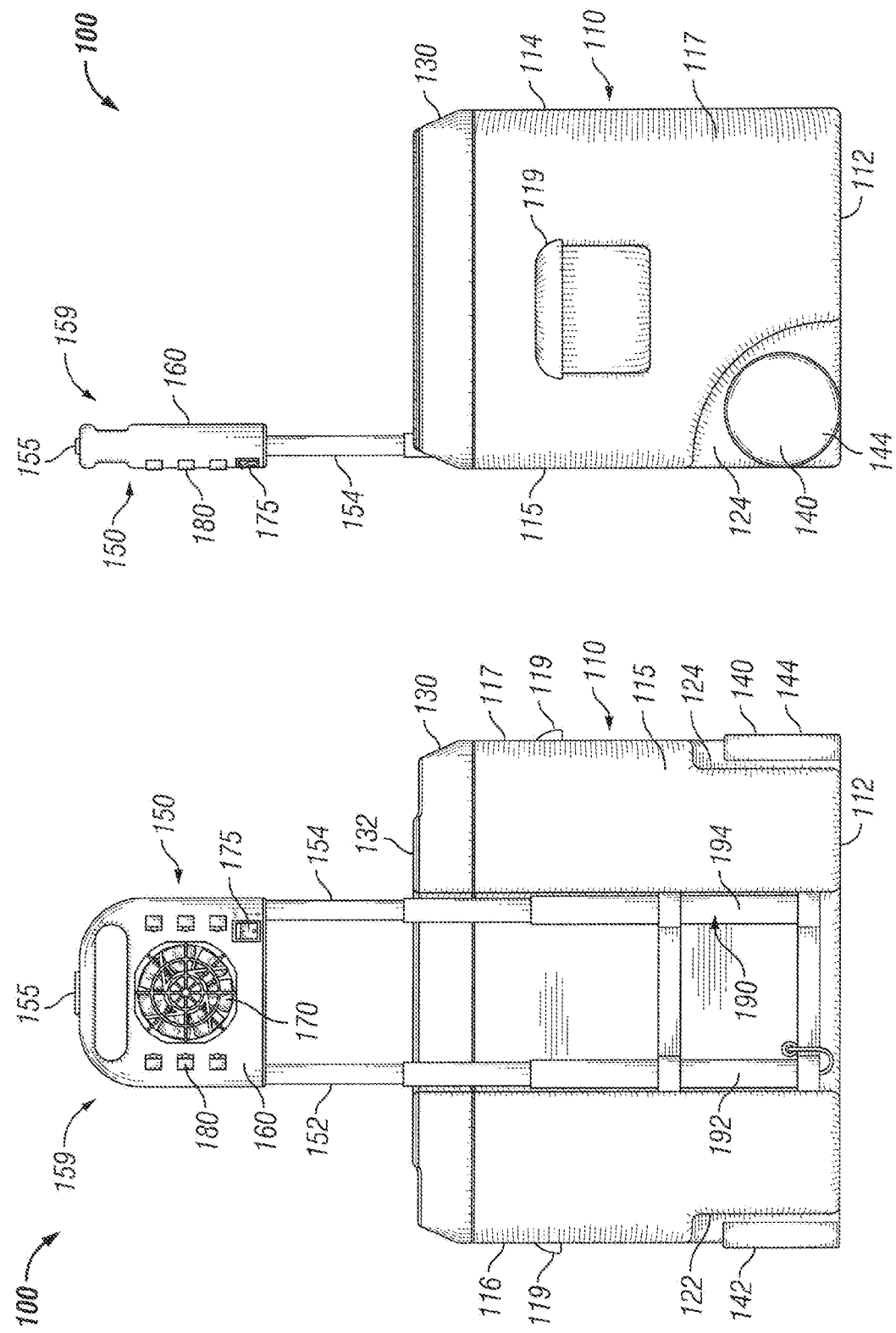

INSULATED CONTAINER WITH FAN

RELATED APPLICATIONS

This application is a non-provisional application of and claims priority under 35 U.S.C. §119 to U.S. Provisional Patent Application No. 61/582,589, titled "Insulated Container With Fan," filed on Jan. 3, 2012, the complete disclosure of which is hereby fully incorporated by reference herein.

TECHNICAL FIELD

The present disclosure relates generally to insulated containers, and more particularly to insulated containers having a fan.

BACKGROUND

Many people enjoy outdoor activities, such as picnics, sports, camping, and fishing. People, oftentimes, take insulated containers, such as coolers, with them to store food and/or beverages so that they can refresh themselves during their outdoor activity. However, many of these people still suffer from the outdoor heat and prefer to be cooled down. The quicker these people are cooled down, the quicker they can resume their outdoor activity.

There are several options available for people to get cooled clown while engaged in their outdoor activity. Typically, some of these people stop their activity and rest for a while so that they can cool down. This option can be time consuming and shorten the time they have to spend on their activity. Alternatively, some people stop their activity and go to their vehicles or an adjacent building to sit in the air conditioning before returning to their activity. This option is very inconvenient, especially when the vehicles or buildings are located at a distance. For example, it is very inconvenient to go to a vehicle or building when out fishing in is lake. In yet another option, some people schedule their activities during morning and/or evening hours, thereby lessening their exposure to heat. Unfortunately, some activities are not available for scheduling at these other hours.

BRIEF DESCRIPTION OF THE DRAWINGS

Reference will now be made to the accompanying drawings, which are not necessarily drawn to scale, and wherein:

FIG. 1A shows a right-front perspective view of an insulated container having a handle in an extended position in accordance with an exemplary embodiment of the present invention;

FIG. 1B shows a left-front perspective view of the insulated container of FIG. 1A in accordance with an exemplary embodiment of the present invention;

FIG. 1E shows a top view of the insulated container of FIG. 1A in accordance with an exemplary embodiment of the present invention;

FIG. 1F shows a front view of the insulated container of FIG. 1A in accordance with an exemplary embodiment of the present invention;

FIG. 1G shows a back view of the insulated container of FIG. 1A in accordance with an exemplary embodiment of the present invention;

FIG. 1H shows a left view of the insulated container of FIG. 1A in accordance with an exemplary embodiment of the present invention;

Figure 1D:
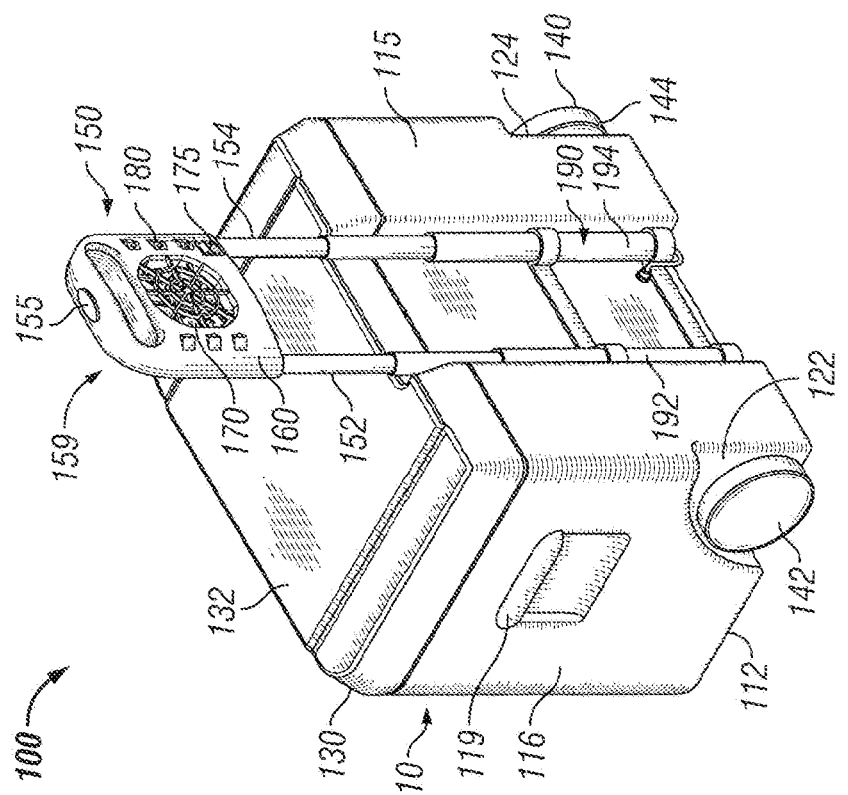
FIG. 1D shows a right-rear perspective view of the insulated container of FIG. 1A in accordance with an exemplary embodiment of the present invention.
Figure 1C:
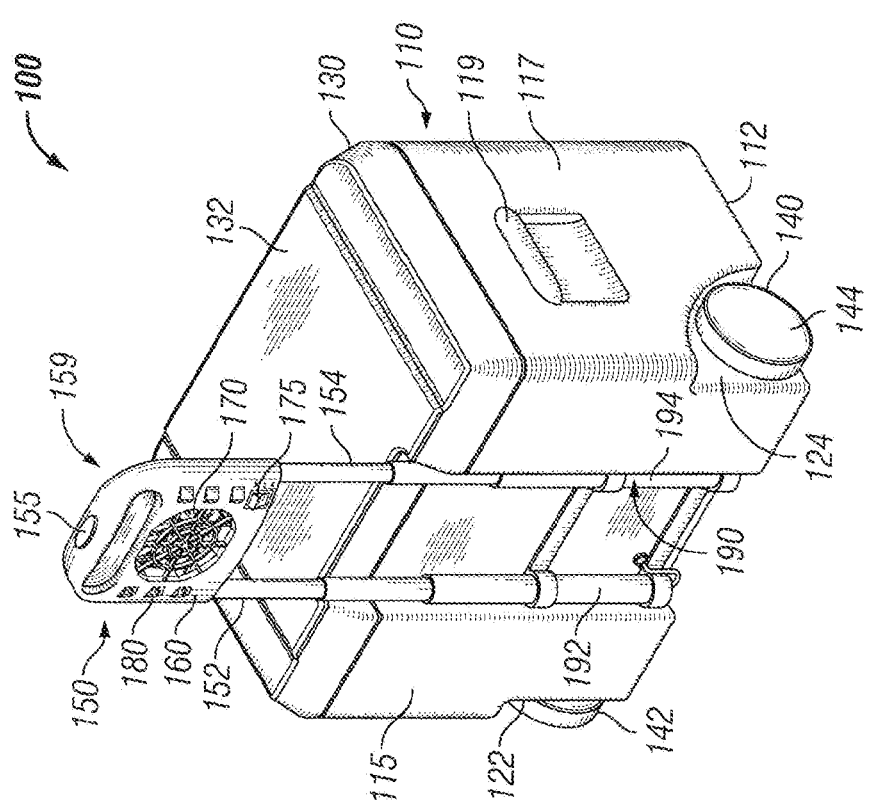
FIG. 1C shows a left-rear perspective view of the insulated container of FIG. 1A in accordance with an exemplary embodiment of the present invention.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION OF THE EXEMPLARY EMBODIMENTS

Embodiments of the invention are directed to insulated containers having a fan and methods for operating these insulated containers. Embodiments of the invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

FIGS. 1A-1I show various views of an insulated container 100 in accordance with an exemplary embodiment of the present invention. The insulated container 100 includes a body 110, to cover 130, a wheel assembly 140, and a handle 150. According to certain exemplary embodiments, the wheel assembly 140 is optional. The insulated container 100 generally is rectangular shaped; however the insulated container 100 is shaped in other geometric or non-geometric shapes in alternative exemplary embodiments.

According to some exemplary embodiments, the body 110 includes a base 112, a first longitudinal sidewall 114, a second longitudinal sidewall 115, a first latitudinal sidewall 116, and a second latitudinal sidewall 117. The first longitudinal sidewall 114 and the second longitudinal sidewall 115 both extend upwardly from the base 112 at opposing edges of the base 112 such that the first longitudinal sidewall 114 and the second longitudinal sidewall 115 are substantially parallel to one another. Similarly, the first latitudinal sidewall 116 and the second latitudinal sidewall 117 both extend upwardly from the base 112 at opposing edges of the base 112 such that the first latitudinal sidewall 116 and the second latitudinal sidewall 117 are substantially parallel to one another and substantially perpendicular to each of the first longitudinal sidewall 114 and the second longitudinal sidewall 115. The base 112, the first longitudinal sidewall 114, the second longitudinal sidewall 115, the first latitudinal sidewall 116, and the second latitudinal sidewall 117 are coupled together to define a cavity 420 (FIG. 4) formed therein. In certain exemplary embodiments, one or more of the sidewalk 114, 115, 116, 117 include a molded handle 119 which can be used to lift and/or move the insulated container from one location to another. Alternatively, a separately formed handlebar (not shown) is coupled to the sides of one or more sidewalls 114, 115, 116, 117 to accomplish the same goals as the molded handle 119.

Figure 4:
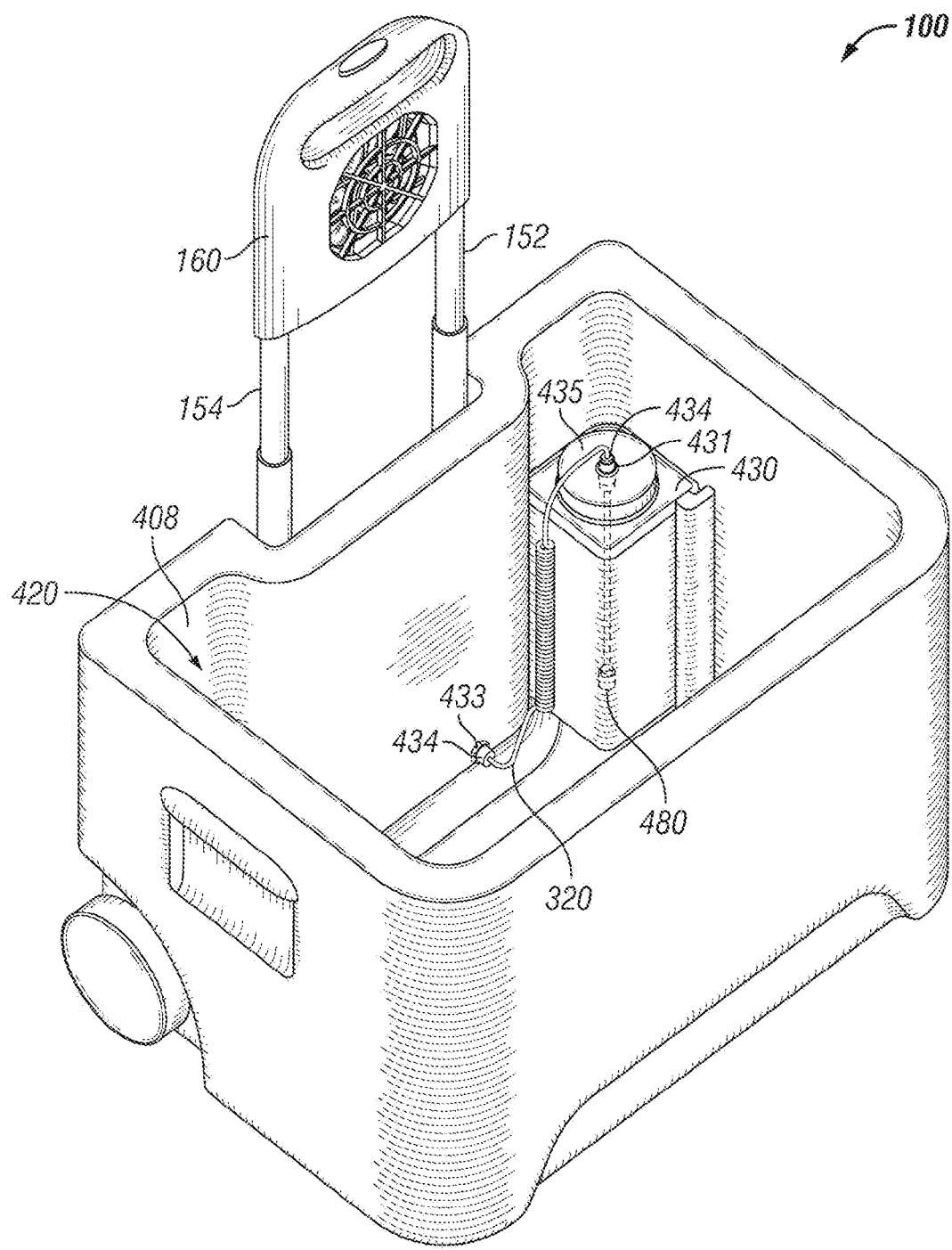
FIG. 4 shows a left-front perspective view of a portion of the insulated container of FIG. 1A with the cover being removed in accordance with an exemplary embodiment of the present invention.

Each of the base 112, the first longitudinal sidewall 114, the second longitudinal sidewall 115, the first latitudinal sidewall 116, and the second latitudinal sidewall 117 includes an outer wall 108 exposed to the outside environment and an inner wall 408 (FIG. 4) which surrounds the cavity 420 (FIG. 4). An insulation (not shown), such as Styrofoam®, is disposed between the outer wall 108 and the inner wall 408 (FIG. 4), in certain exemplary embodiments, to facilitate in keeping the contents placed within the cavity 420 (FIG. 4) cooler, or hotter, for a longer time period than if insulation were not provided. The outer wall 108 of each of the base 112, the first longitudinal sidewall 114, the second longitudinal sidewall 115, the first latitudinal sidewall 116, and the second latitudinal sidewall 117 are coupled together. In other exemplary embodiments, the outer wall 108 of each of base 112, the first longitudinal sidewall 114, the second longitudinal sidewall 115, the first latitudinal sidewall 116, and the second latitudinal sidewall 117 are molded together as a single component. Similarly, the inner wall 408 (FIG. 4) of each of the base 112, the first longitudinal sidewall 114, the second longitudinal sidewall 115, the first latitudinal sidewall 116, and the second latitudinal sidewall 117 are coupled together. In other exemplary embodiments, the inner wall 408 (FIG. 4) of each of base 112, the first longitudinal sidewall 114, the second longitudinal sidewall 115, the first latitudinal sidewall 116, and the second latitudinal sidewall 117 are molded together as a single component. According to some exemplary embodiments, the outer wall 108 is fabricated using a polymer material; however, other suitable materials known to persons having ordinary skill in the art can be used without departing from the scope and spirit of the exemplary embodiment. Similarly, according to some exemplary embodiments, the inner wall 408 (FIG. 4) also is fabricated using a polymer material; however, other suitable materials known to persons having ordinary skill in the art can be used without departing from the scope and spirit of the exemplary embodiment.

According to certain exemplary embodiments, the base 112, the second longitudinal sidewall 115, and the first latitudinal sidewall 116 are shaped and coupled to one another to form a first recess 122 substantially where each of the base 112, the second longitudinal sidewall 115, and the first latitudinal sidewall 116 couple to one another. The first recess 122 is formed at an exterior portion of the body 110. The first recess 122 is formed at a different location along the bottom portion of the base 112 or is not formed altogether according to certain other exemplary embodiments. A second recess 124, similar to the first recess 122, is formed substantially where each of the base 112, the second longitudinal sidewall 115, and the second latitudinal sidewall 117 couple to one another. The second recess 124 also is formed at an exterior portion of the body 110. The second recess 124 is formed at a different location along the bottom portion of the base 112 or is not formed altogether according to certain other exemplary embodiments.

The cover 130 is coupled along the upper edges of at least one of the first longitudinal sidewall 114, the second longitudinal sidewall 115, the first latitudinal sidewall 116, and the second latitudinal sidewall 117. According to some exemplary embodiments, the cover 130 is friction fitted along each of the upper edges of the first longitudinal sidewall 114, the second longitudinal sidewall 115, the first latitudinal sidewall 116, and the second latitudinal sidewall 117. However, in other exemplary embodiments, the cover 130 is coupled to the upper edges of at least one of the first longitudinal sidewall 114, the second longitudinal sidewall 115, the first latitudinal sidewall 116, and the second latitudinal sidewall 117 using suitable fastening devices known to persons having ordinary skill in the art, such as hinges. The cover 130 is removable or at least partially removable from the body 110 according to some exemplary embodiments. The cover 130 is formed with an opening (not shown) therein and includes a lid 132 covering the opening according to certain exemplary embodiments. The lid 132 is pivotally or slidably coupled to the cover 130 so that it is movable to an open position to insert and/or remove contents from the cavity 420 (FIG. 4) and movable to a closed position to encapsulate and/or thermally isolate the contents within the cavity 420 (FIG. 4). The lid 132 is shaped to cover the entire opening and is coupled to the cover 130 using hinges, pins, sliding rails, snapping features, friction fitting technology, or other suitable fastening devices known to persons having ordinary skill in the art. According to some exemplary embodiments, the cover 130 is movable to an open position to insert and/or remove contents from the cavity 420 (FIG. 4) and movable to a closed position to encapsulate and/or thermally isolate the contents within the cavity 420 (FIG. 4).

The wheel assembly 140 includes a first wheel 142 and a second wheel 144 according to certain exemplary embodiments. However, alternative exemplary embodiments include a wheel assembly 140 that includes greater or fewer wheels. According to some exemplary embodiments, the wheel assembly 140 includes an axle (not shown) extending from the first wheel 142 to the second wheel 144. According to certain exemplary embodiments, the first wheel 142 is positioned at least partially within the first recess 122 and the second wheel 144 is positioned at least partially within the second recess 124. Once the wheels 142, 144 are coupled to the body 110, at least a portion of the wheels 142, 144 extend below the base 112 according to some exemplary embodiments. A portion of the axle is disposed within the body 110 according to some exemplary embodiments or can be inserted into a groove (not shown) formed within the outer wall of the base 112. The first and second wheels 142, 144 are configured to rotate, thereby facilitating in rolling the insulated container 100 from one location to another location. Although the first and second wheels 142, 144 are positioned at least partially within the first recess 122 and the second recess 124, respectively, the first and second wheels 142, 144 are not positioned within the first recess 122 and the second recess 124 according to some other exemplary embodiments, especially when recesses 122, 124 are not formed. Although certain exemplary embodiments have the axle extending from the first wheel 142 to the second wheel 144, the axle extends from each of the wheels 142, 144 to an adjacent portion of the body 110. Thus, each of the wheels 142, 144 are coupled to body 110 and are not coupled to one another according to some exemplary embodiments. The outer circumference of the wheels 142, 144 are fabricated using rubber, plastic, metal, or any other suitable material known to persons having ordinary skill in the art.

The handle 150 includes a first bar 152, a second bar 154, and a cooling module 160. The first bar 152 is positioned substantially parallel to the second bar 154. Although a first bar 152 and a second bar 154 are utilized in forming the handle 150, greater or fewer bars are used in other exemplary embodiments. The cooling module 160 is coupled at or substantially near the upper portions of each of the first bar and the second bar 154, thereby forming a substantially U-shaped handle 150. However, the handle 150 is shaped differently in other exemplary embodiments. In certain exemplary embodiments, the first bar 152, the second bar 154, and the cooling module 160 are formed as a single component. The cooling module 160 includes as fan 170 and a switch 175. According to some exemplary embodiments, the cooling module 160 also includes one or more misting nozzles 180 oriented to direct fluid into the area defined by the profile of the fan 170, which is further described below. The handle 150 is fabricated using polymers, metals, or any other suitable material or combination of materials.

The handle 150 is securely coupled, either directly or indirectly, to the second longitudinal sidewall 115, but is coupled to any of the other sidewalls 114, 116, 117 in other exemplary embodiments. This handle 150 is used in conjunction with the wheel assembly 140, at times, to roll the insulated container 100 from one location to another location. According to some exemplary embodiments, the handle 150 is indirectly coupled to the second longitudinal sidewall 115 using a mounting bracket 190. The mounting bracket 190 is securely coupled to the second longitudinal sidewall 115 using fasteners, clips, nails, screws, rivets, or some other suitable fastening device. According to some exemplary embodiments, the mounting bracket 190 includes a first receiving bar 192 and a second receiving bar 194 that is substantially parallel to the first receiving bar 192; however, greater or fewer receiving bars are present in other exemplary embodiments. The first bar 152 and the second bar 154 of the handle 150 are inserted into the first receiving bar 192 and the second receiving bar 194, respectively. In some of these exemplary embodiments, the first and second bars 152, 154 are telescopically extended from the receiving bars 192, 194, thereby positioning the handle 150 in an extended position 159. When the handle 150 is in the extended position 159, the cooling module 160 is at a first elevation. Alternatively, the first and second bars 152, 154 are slidably extended from the receiving bars 192, 194, thereby also positioning the handle 150 in the extended position 159. In yet other exemplary embodiments, the first and second bars 152, 154 are directly coupled to the second longitudinal sidewall 115 and slidably extend along the second longitudinal sidewall 115 to position the handle 150 in the extended position 159.

Figure 2:
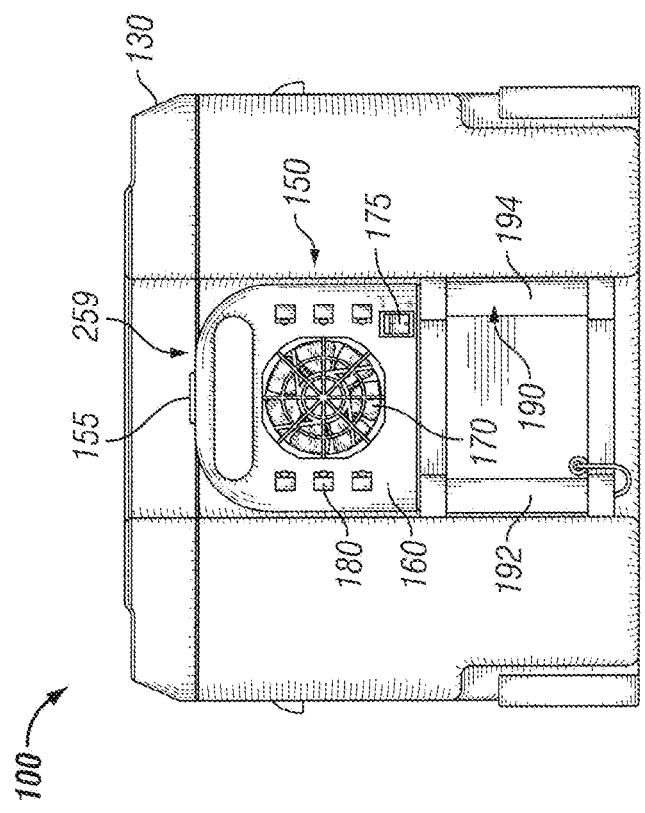
FIG. 2 shows a back view of the insulated container of FIG. 1A having the handle in a retracted position in accordance with an exemplary embodiment of the present invention.
Figure 1I:
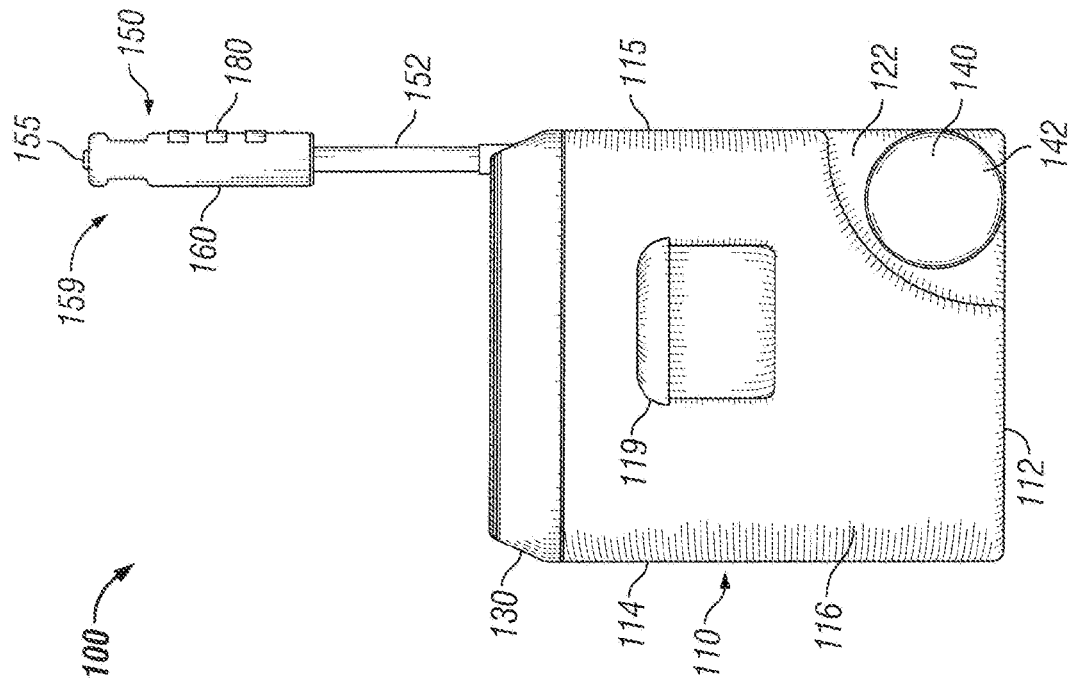
FIG. 1I shows a right view of the insulated container of FIG. 1A in accordance with an exemplary embodiment of the present invention.

In some exemplary embodiments, the handle 150 includes a button 155 positioned at or near the top portion of the handle 150. However, this button 155 is positioned at some other location on the insulated container 100 in other exemplary embodiments. In some exemplary embodiments, the handle 150 is locked when positioned in the extended position 159. As previously mentioned, when the handle 150 is in the extended position 159, the cooling module 160 is at the first elevation. The button 155 is depressed to unlock the handle 150 and return it to a retracted position 259 (FIG. 2), which occurs when the cooling module 160 is positioned at a second elevation, as seen in FIG. 2. The first elevation is devotionally higher than the second elevation. In some exemplary embodiments, the handle 150 is locked when positioned in the retracted position 259 (FIG. 2). The button 155 is depressed to unlock the handle 150 and extend it to the extended position 159. In certain exemplary embodiments, the handle 150 is positionable at one or more intermediate positions between the extended position 159 and the retracted position 259 (FIG. 2). Thus, the cooling module 160 also is positionable at one or more intermediate positions between the extended position 159 and the retracted position 259 (FIG. 2), thereby accommodating the different heights of the users. For example, the user can adjust the elevation of the cooling module 160 depending on whether the user is either sitting or standing, or is tail or shorter than another user. The mechanisms and/or components for operating the button 155 is known to people having ordinary skill in the art and is not presented in detail herein for the sake of brevity.

FIG. 2 shows a back view of the insulated container 100 having the handle 150 in the retracted position 259 in accordance with an exemplary embodiment of the present invention. Referring to FIG. 2, the cooling module 160 is positioned devotionally below the cover 130 when the handle 150 is in the retracted position 259. However, in some exemplary embodiments, the cooling module 160 is positioned devotionally at or immediately above the cover 130 when the handle 150 is in the retracted position 259. Although the cooling module 160 is moved from the retracted position 259 to the extended position 159 (FIG. 1A) in a substantially perpendicular manner, other exemplary embodiments have the cooling module 160 moved from a retracted position to an extended position in a angular, or oblique, manner.

Figure 3:
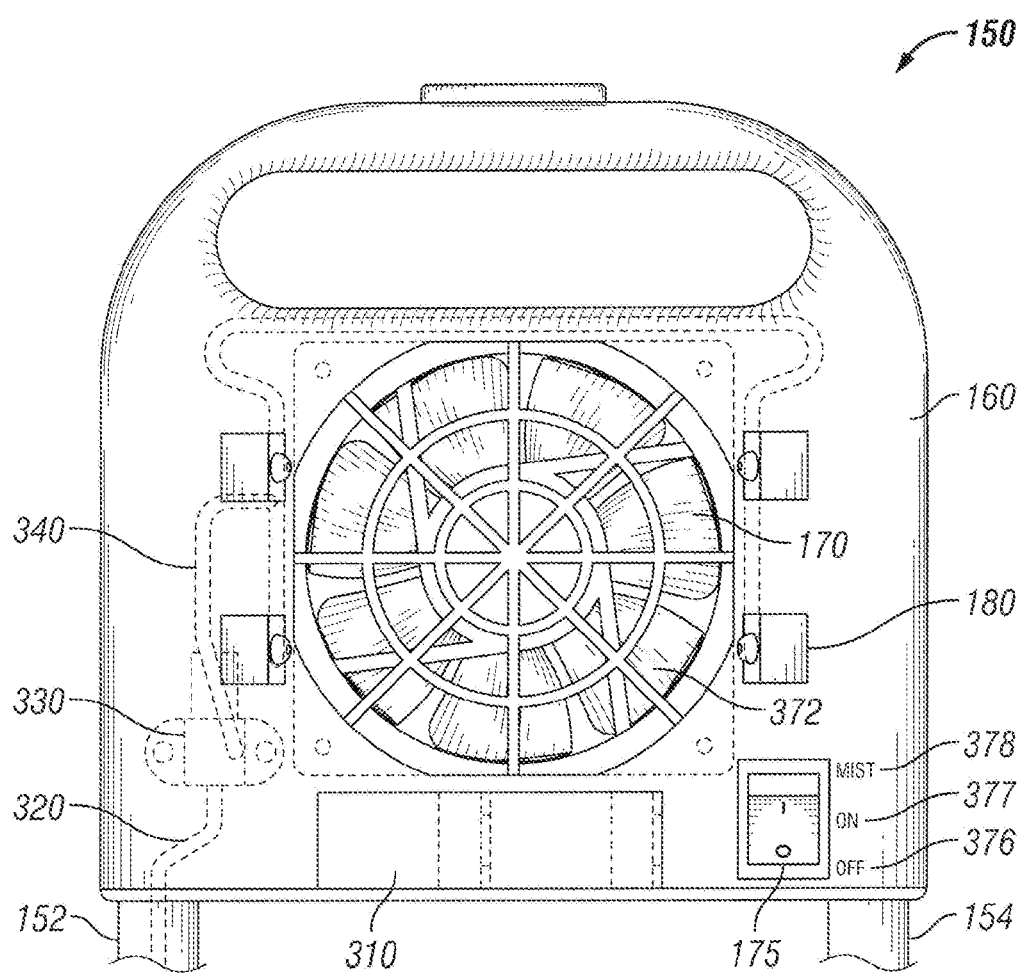
FIG. 3 shows an elevational view of the upper portion of the handle of FIG. 1A illustrating internal components therein in accordance with an exemplary embodiment of the present invention.

FIG. 3 shows an elevational view of the upper portion of the handle 150 illustrating internal components therein in accordance with an exemplary embodiment of the present invention. FIG. 4 shows a left-front perspective view of a portion of the insulated container 100 with the cover 130 (FIG. 1A) being removed in accordance with an exemplary embodiment of the present invention. Referring to FIGS. 3 and 4, the cooling module 160 and associated components, mentioned below, are described.

As previously mentioned, the cooling module 160 includes the fan 170 and the switch 175. According to some exemplary embodiments, the cooling module 160 also includes a power source 310 which supplies power to at least the fan 170. However, in other exemplary embodiments, the power source 310 is located elsewhere cm the insulated container 100. In certain exemplary embodiments, the power source 310 includes batteries; however, the power source 310 can be any other suitable power delivering device that is known to persons having ordinary skill in the art. The fan 170 includes one or more blades 372 that rotate to provide air currents in at least one desired direction. The rotation of the blades 372 defines the profile of the fan 170. These blades 372 are fabricated using aluminum, steel, plastic, or some other suitable material known to persons having ordinary skill in the art. The switch 175 is positionable in at least two positions, an "oil" position 376 and an "on" position 377. However, in other exemplary embodiments, the switch 175 is positionable in greater than two positions. When the switch 175 is in the "off" position 376, the fan 170 does not rotate. When the switch 175 is in the "on" position 377, the fan 170 rotates and generates air currents. In certain exemplary embodiments, the fan 170 is designed to pivot either vertically up and/or down or horizontally left and/or right.

In certain exemplary embodiments, as previously mentioned, the cooling module 160 also includes one or more misting nozzles 180 oriented to direct fluid into the area defined by the profile of the fan 170. In some exemplary embodiments, the misting nozzles 180 are positioned immediately near the perimeter of the blades 372. In these exemplary embodiments, the insulated container 100 also includes a mist reservoir 430, a suction line 320, a pump 330, and a discharge line 340. The mist reservoir 430 is a container capable of being filled with fluid, such as water. This mist reservoir 430 is positioned within the cavity 420 and includes a lid 435 that can be removed from the mist reservoir 430 and provide access to the interior of the mist reservoir 430. The mist reservoir 430 is fabricated from plastic, metal, or some other suitable material. The suction line 320 extends from within the mist reservoir 430 to the pump 330. The suction line 320 is fabricated using plastic tubing, but can be made from copper tubing or some other suitable tubing material. The pump 330 is positioned within the cooling module 160, but can be positioned elsewhere on the insulated container 100. For example, the pump 330 is a submersible pump that is located within the mist reservoir 330 according to some exemplary embodiments. The discharge line 340 extends from the pump 330 to each of the misting nozzles 180. There are four misting nozzles 180 shown, however, fewer or greater misting nozzles 180 are used in other exemplary embodiments. The discharge line 340 is fabricated using plastic tubing, but can be made from copper tubing or some other suitable tubing material in other exemplary embodiments.

In certain exemplary embodiments that include the misting nozzles 180, the pump 330 is powered by the power source 310 or some other power providing device. Additionally, the switch 175 is positionable in a third position, or a "mist" position 378. When the switch 175 is in the "mist" position 378, the fan 170 rotates to generate air currents and the pump 330 operates to send fluid into and through the misting nozzles 180. The fluid exits the misting nozzles 180, either via a fluid stream or a fluid mist, and enters the profile of the fan 170. The air currents produced by the fan 170 direct the fluid in the same direction as the air currents, which is towards a user. Hence, either the air currents alone or the combination of air currents and misting fluid facilitate cooling down of the user.

According to some exemplary embodiments, the suction line 320 proceeds from within the mist reservoir 430 and through an opening 431 formed in the mist reservoir 430. The suction line 420 further proceeds from the opening 431 and through an opening 433 formed in the body 110. The suction line 420 further proceeds from the opening 433 and through one of the first and second bars 152, 154 to the pump 330 located in the cooling module 160. A fitting 434 is provided at the opening 431 and the opening 433 to prevent leakage. Additionally, in some exemplary embodiments, a check valve 480 is provided at one end of the suction line 320 that is disposed within the mist reservoir 430. The check valve 480 prevents the fluid from flowing in the opposite direction back into the mist reservoir 430. Alternatively, other devices, such as an orifice (not shown) can be used in lieu of or in addition to the check valve 480. Although some exemplary embodiments of the insulated container 100 have been illustrated and described herein, several additional embodiments exist which are to be included within the spirit and scope of the invention. For example, the placement of the misting nozzles 180 can be positioned on or near a central axis of the fan 170 and discharge fluid outwardly into the profile of the fan 170.

Although each exemplary embodiment has been described in detail, it is to be construed that any features and modifications that are applicable to one embodiment are also applicable to the other embodiments. Furthermore, although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

We claim:
1. An insulated container, comprising:
a body defining a cavity therein;
a handle coupled to the body and movable between a retracted position and an extended position, the handle comprising:
a cooling module comprising a fan.
2. The insulated container of claim 1, wherein cooling module is positioned at a first elevation when the handle is in the retracted position and is positioned at a second elevation when the handle is in the extended position, the second elevation being higher than the first elevation.
3. The insulated container of claim 2, wherein the first elevation and the second elevation are axially aligned.
4. The insulated container of claim 1, further comprising one or more misting nozzles oriented to emit fluid into the profile of the fan.
5. The insulated container of claim 4, wherein the misting nozzles are positioned on the cooling module.
6. The insulated container of claim 5, wherein the misting nozzles are positioned outside of and near the perimeter of the profile of the fan.
7. The insulated container of claim 4, further comprising:
a container positioned within the cavity, the container being filled with a fluid;
a pump;
a suction line fluidly coupling the interior of the container to the pump; and
a discharge line fluidly coupling the pump to the misting nozzles,
wherein the pump transports the fluid from the container to the misting nozzles.
8. The insulated container of claim 7, wherein at least a portion of the suction line is inserted into a portion of the handle.
9. The insulated container of claim 7, further comprising a switch, the switch being electrically coupled to the fan and the pump, the switch being positionable in a first position, a second position, and a third position, wherein the first position deactivates the fan, the second position activates the fan, and the third position activates the fan and the pump.
10. The insulated container of claim 7, further comprising a check valve coupled to the suction line.
11. The insulated container of claim 1, wherein the fan produces air currents, wherein the temperature of the air currents is the same as the temperature of the ambient air.
12. The insulated container of claim 1, further comprising a switch, the switch being electrically coupled to the fan and positionable in a first position and a second position, wherein the first position turns off the fan and the second position turns on the fan.
13. The insulated container of claim 1, wherein the fan is vertically adjustable.
14. The insulated container of claim 1, wherein the fan is horizontally adjustable.

15. The insulated container of claim 1, wherein the body comprises an inner wall, and outer wall, and an insulating material disposed therebetween.

16. The insulated container of claim 1, wherein the handle is positionable and lockable to at least one intermediate position, the at least one intermediate position being located between the retracted position and the extended position.

17. A method for assembling an insulated container, comprising:
  providing a body defining a cavity therein;
  coupling a handle to an outer wall of the body, the handle comprising a cooling module, the cooling module comprising a fan,
  wherein the handle is movable between at least a retracted position and an extended position.

18. The method of claim 17, wherein the cooling module is positioned at a first elevation when the handle is in the retracted position and is positioned at a second elevation when the handle is in the extended position, the second elevation being higher than the first elevation.

19. The method of claim 17, further comprising:
  coupling one or more misting nozzles on the cooling module; and
  orienting the misting nozzles to emit a fluid into the profile of the fan.

20. The method of claim 19, further comprising:
  positioning a reservoir within the cavity; and
  fluidly coupling a pump to the interior of the reservoir and to the one or more misting, nozzles,
  wherein the pump transports the fluid from the reservoir to the misting nozzles.

* * * * *